Figure 1:
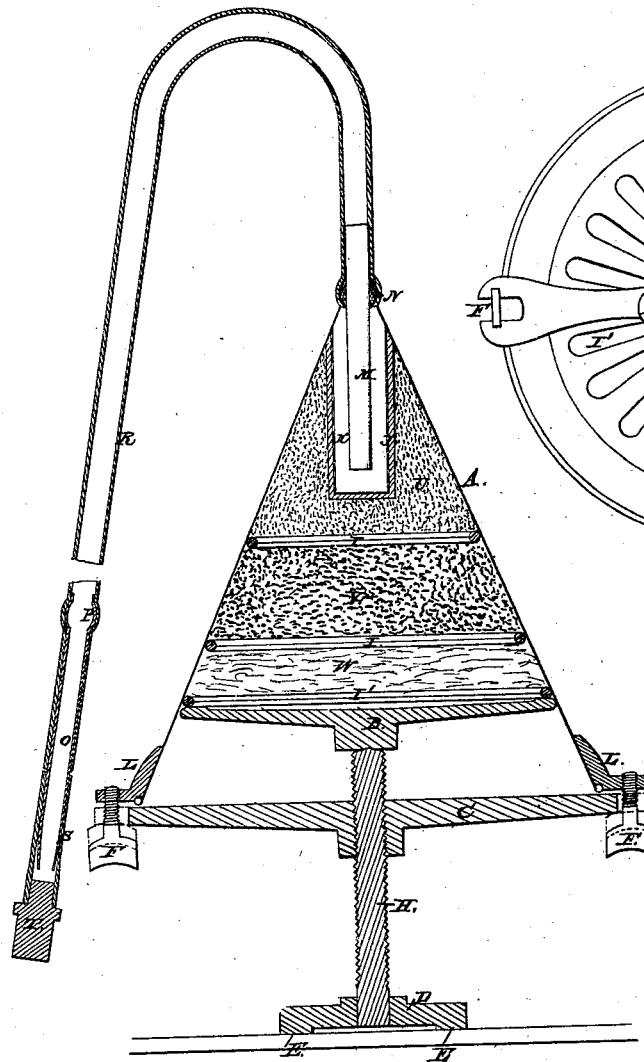
Figure 2:
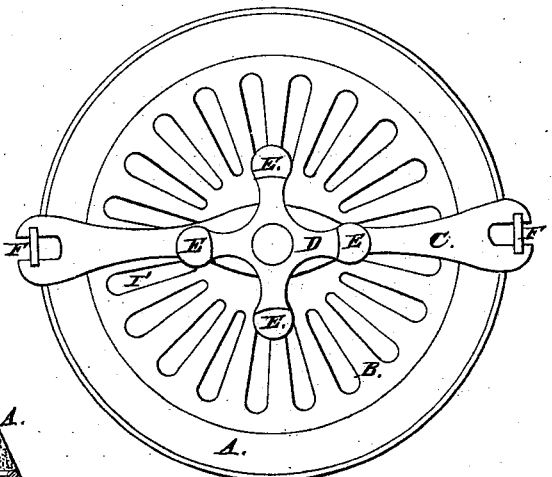
Figure 3:

T. Simmons,
Water Filter,
Patented Nov. 6, 1866.

Nº 59,467.

Witnesses.
Leonard J Dimock.
D. Lyon

Inventor.
Thomas Simmons.

UNITED STATES PATENT OFFICE.

THOMAS SIMMONS, OF CHICAGO, ILLINOIS.

IMPROVEMENT IN FILTERS.

Specification forming part of Letters Patent No. 59,467, dated November 6, 1866.

*To all whom it may concern:*

Be it known that I, THOMAS SIMMONS, of Chicago, in the county of Cook and State of Illinois, have invented a Conical Compressed Filter; and I do hereby declare that the following is a full, clear, and exact description thereof, reference being had to the accompanying drawings and letters of reference marked thereon, making a part of this specification, in which—

Figure I is a central sectional elevation of my filter. Fig. II is a view of the bottom of the same. Fig. III is a perspective representation of the perforated cylinder covering the lower end of the discharge-pipe.

The nature of my invention consists in covering the lower end of the discharge-pipe, at the top of the metallic cone, with a perforated cylinder, which is also covered with flannel cloth, operating as a strainer, and in separating the different kinds of filtering material used by means of flannel cloth or other similar material secured to a metallic ring for keeping the cloth in place; and also in putting a bar across the bottom of the cone, and securing it in such a manner that a screw put through the bar will, when operated, force a metallic follower against the filtering material, so as to press it as compactly as desired, for purifying the water passing through; and further, in making a glass nozzle for the lower end of the siphon, and adjusting a cap over the end of the same, for shutting off the flow of water, so that no suction is required to put the siphon in operation when once started, although the tube be not kept suspended as when filtering.

By this arrangement a very substantial, convenient, and effectual device is produced for taking the decayed vegetable and animal matter out of water, as it occupies but little space, and can be set in any common vessel used for holding water, and filter fast enough for all ordinary purposes.

To enable others skilled in the art to make and use my filter, I will describe the method of construction and operation of the same.

A represents the outside conical case, which is made of zinc or such material as will not corrode when put in water. At the top of the case is made an opening for receiving the discharge-pipe M, which is secured to the case by means of solder, or otherwise, in a permanent manner. The lower end of the pipe is covered with the perforated cap k, used as a support for the strainer J, made of flannel or of similar material, the object being to prevent the sand U from being pressed into the lower end of the pipe, which would very much lessen the filtering-service at that point.

I is the flannel cloth dividing the sand from the charcoal, as seen at Fig. I, and the cotton from the charcoal. I' is the flannel between the cotton W and the follower B. The flannel is used for the purpose of keeping the sand U, charcoal V, and cotton W separate from each other, and as a strainer for preventing the impurities in the water from passing through. X is the metallic rings (to which the flannel is attached by means of thread) which are used to keep the strainers in place. The cotton also operates as a strainer, and may be taken out and washed when desired.

By this general arrangement in filling, the case A need not be so large as those in common use, for the strainers obviate the necessity of using but little sand and charcoal.

H is the screw passing through the bar C, and the end resting against the follower B, in position for pressing the filtering material compactly in the case A. The bar C has open mortises made in the ends, as seen at Fig. II, for the purpose of allowing the thumb-screws F to pass through the bar and into the lugs L attached to the case A and hold the bar in position. D is the head of the screw H, and is also the foot of the filter E, being the parts extending downward and resting upon the bottom of the vessel containing the impure water. O shows the glass nozzle, on which is made the bilge P, for holding the rubber tube R from slipping off. S is the cap, made of rubber, the lower end being closed with the stopper T, made of glass or other suitable material. N is the bilge made on the pipe M for securing the upper end of the tube R.

Operation: When the filter has been constructed as above described, it can be set in the water to be purified, similar to portable filters now in use. The cap S must then be removed and suction applied to the nozzle O, either by means of the mouth or otherwise, so as to exhaust the air above the water, at which time the purified water will pass downward through the siphon or rubber tube R. The cap can then be replaced on the nozzle, which will shut the flow of water until again removed.

Having thus fully described my device, what I claim, and desire to secure by Letters Patent of the United States, is—

1. The arrangement and combination of the cap K, cloth J and I I I', cotton W, and follower B, with bar C, screw H, and foot D, substantially as set forth.

2. In combination with the foregoing, the nozzle O, cap S, stopper T, with the tube R and pipe M, as described and set forth.

THOMAS SIMMONS.

Witnesses:
LEONARD S. DIMOCK,
D. J. LYON.